(12) United States Patent
Tomimoto

(10) Patent No.: US 11,142,441 B2
(45) Date of Patent: Oct. 12, 2021

(54) INDUSTRIAL VEHICLE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventor: Naoya Tomimoto, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/677,770

(22) Filed: Nov. 8, 2019

(65) Prior Publication Data
US 2020/0148519 A1 May 14, 2020

(30) Foreign Application Priority Data
Nov. 12, 2018 (JP) .............................. JP2018-212132

(51) Int. Cl.
| | |
|---|---|
| B66F 9/20 | (2006.01) |
| B66F 9/22 | (2006.01) |
| B60L 50/70 | (2019.01) |
| B66F 9/24 | (2006.01) |
| B60L 50/52 | (2019.01) |

(52) U.S. Cl.
CPC .............. B66F 9/22 (2013.01); B60L 50/52 (2019.02); B60L 50/70 (2019.02); B66F 9/205 (2013.01); B66F 9/24 (2013.01); B60L 2200/42 (2013.01)

(58) Field of Classification Search
CPC .. B60W 10/08; B60W 10/26; B60W 2300/12; B60W 2300/121; B60W 2300/123; B60W 2510/285; B60W 2510/28; B60W 2710/28;
(Continued)

(56) References Cited

U.S. PATENT DOCUMENTS 7,000,716 B2 * 2/2006 Leifert .................... B60L 50/71
180/65.1
7,207,405 B2 * 4/2007 Reid ....................... B60L 50/72
180/65.31
(Continued)

FOREIGN PATENT DOCUMENTS

JP 02-168803 A 6/1990
JP 2002-204505 A 7/2002
(Continued)

Primary Examiner — Emma K Frick
(74) Attorney, Agent, or Firm — Sughrue Mion, PLLC

(57) ABSTRACT

A forklift includes a fuel cell system. The fuel cell system includes a battery stack and a capacitor and is electrically connected to a vehicle system. The vehicle system includes a control valve that switches supply of hydraulic oil to a power steering cylinder and a cargo-handling cylinder, a cargo-handling pump that supplies hydraulic oil stored in a hydraulic oil tank to the control valve, a cargo-handling motor that drives the cargo-handling pump, and an on-load valve that returns the hydraulic oil from the control valve to the hydraulic oil tank. The fuel cell system operates the fuel cell system to execute a warm-up control. A vehicle ECU continues supplying power from the fuel cell stack to the cargo-handling motor during the execution of the warm-up control.

3 Claims, 4 Drawing Sheets

(58) Field of Classification Search
CPC .............. B60W 2710/285; B60L 1/003; B60L 2200/42; B60L 50/70; B60L 50/71; B60L 50/72; B60L 58/31
See application file for complete search history.

(56) References Cited

U.S. PATENT DOCUMENTS

| | | | | |
|---|---|---|---|---|
| 8,092,197 | B2* | 1/2012 | Fujii | H01M 8/0494 417/411 |
| 8,203,310 | B2* | 6/2012 | McCabe | B60L 58/10 320/132 |
| 8,343,675 | B2* | 1/2013 | Manabe | H01M 8/04559 429/430 |
| 8,347,998 | B2* | 1/2013 | Ericson | B60K 6/50 180/165 |
| 8,697,305 | B2* | 4/2014 | Matsuura | H01M 8/0662 429/443 |
| 10,358,050 | B2* | 7/2019 | Tomimoto | B60L 15/2045 |
| 2006/0162973 | A1* | 7/2006 | Harris | B60K 6/00 180/65.31 |
| 2007/0062894 | A1* | 3/2007 | Kubusch | B66F 9/07518 211/85.18 |
| 2009/0236182 | A1* | 9/2009 | Yamagami | B66F 9/24 187/222 |
| 2010/0186404 | A1* | 7/2010 | Yasufuku | B60W 10/30 60/459 |
| 2015/0372322 | A1* | 12/2015 | Shimoyana | H01M 8/0273 429/515 |
| 2017/0326985 | A1* | 11/2017 | Brandau | H01M 8/04067 |
| 2018/0131019 | A1* | 5/2018 | Tomimoto | H01M 10/48 |
| 2020/0083547 | A1* | 3/2020 | Mizukusa | H01M 8/04201 |

FOREIGN PATENT DOCUMENTS

| | | |
|---|---|---|
| JP | 2008-280178 A | 11/2008 |
| JP | 2014-082056 A | 5/2014 |
| JP | 2015-228305 A | 12/2015 |
| JP | 2018-73796 A | 5/2018 |

* cited by examiner

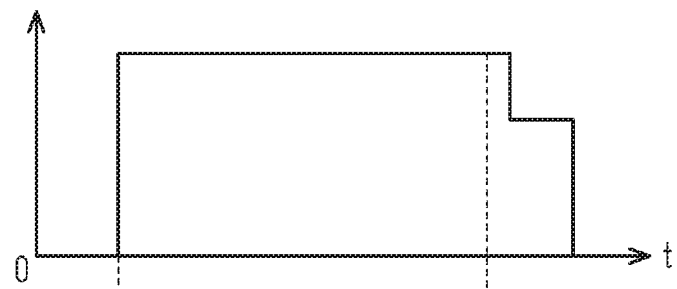
Fig.5A Amount of Power Generated by Fuel Cell Stack
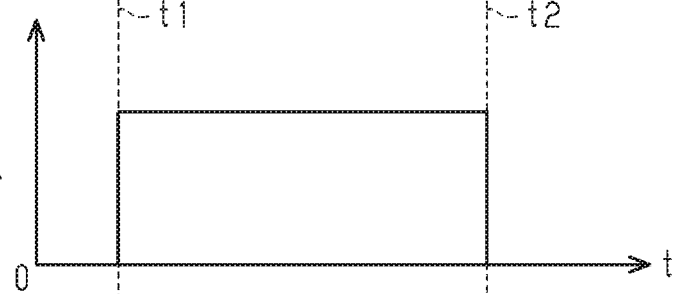
Fig.5B Amount of Power Consumed by Cargo-Handling Motor
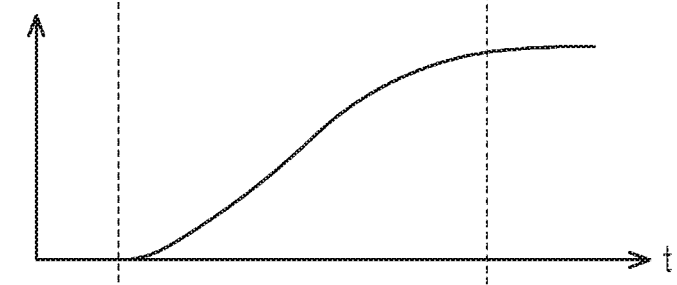
Fig.5C Temperature of Fuel Cell System
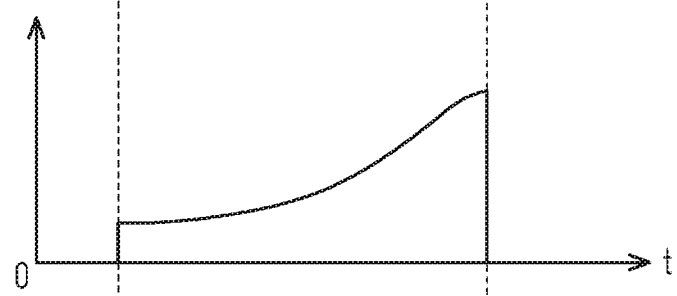
Fig.5D Rotation Speed of Cargo-Handling Motor
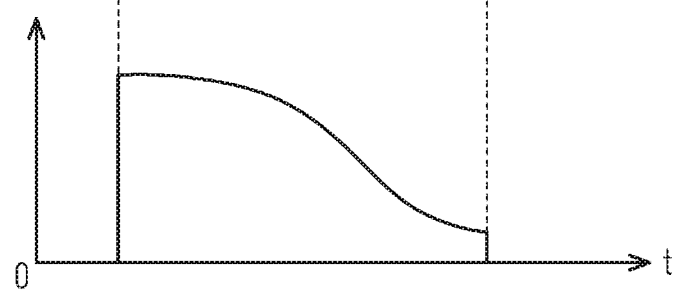
Fig.5E Torque of Cargo-Handling Motor

INDUSTRIAL VEHICLE

BACKGROUND

1. Field

The present disclosure relates to an industrial vehicle.

2. Description of Related Art

Japanese Laid-Open Patent Publication No. 2014-82056 discloses a fuel cell system mounted on an industrial vehicle such as a forklift. The fuel cell system includes a fuel cell stack and a capacitor, which is electrically connected to the fuel cell stack. The fuel cell system is electrically connected to the vehicle system. When the power generated in the fuel cell stack of the fuel cell system exceeds the power required by the vehicle system, the capacitor is charged with the excess power. In contrast, when the power generated in the fuel cell stack falls below the power required by the vehicle system, the power corresponding to the insufficiency is discharged from the capacitor.

Under low temperature, a warm-up operation of the fuel cell system is performed by operating the fuel cell stack in some cases. In this case, since the capacitance of the capacitor in the industrial vehicle disclosed in the above-described publication is small, the capacitor cannot consume the power generated in the fuel cell stack if the generated power is high in the warm-up control. Accordingly, the warm-up control must be performed while limiting the power generated in the fuel cell stack to a low level. The warm-up of the fuel cell system thus may take long time to complete.

SUMMARY

Accordingly, it is an objective of the present disclosure to provide an industrial vehicle that completes warm-up of a fuel cell system at an early stage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an industrial vehicle including a fuel cell system is provided. The fuel cell system is electrically connected to a vehicle system. The fuel cell system includes a fuel cell stack and a capacitor that is electrically connected to the fuel cell stack. The vehicle system includes a control valve, a cargo-handling pump, a cargo-handling motor, a returning device, and a controller. The control valve switches supply of hydraulic oil to supply destinations including at least one of a power steering cylinder or a cargo-handling cylinder. The cargo-handling pump supplies hydraulic oil stored in a hydraulic oil tank to the control valve. The cargo-handling motor drives the cargo-handling pump. The returning device is configured to return the hydraulic oil from the control valve to the hydraulic oil tank when supply of the hydraulic oil from the control valve to the supply destinations is stopped. The controller is configured to control operation of the cargo-handling motor. The controller is configured to execute a warm-up control to warm up the fuel cell system by operating the fuel cell stack, and continue supplying power from the fuel cell stack to the cargo-handling motor during execution of the warm-up control.

Other features and aspects will be apparent from the following detailed description, the drawings, and the claims.

BRIEF DESCRIPTION OF THE DRAWINGS

FIG. 5A is a timing diagram showing changes in the amount of power generated in the fuel cell stack.

FIG. 5B is a timing diagram showing changes in the amount of power consumption of the cargo-handling motor.

FIG. 5C is a timing diagram showing changes in the temperature of the fuel cell system.

FIG. 5D is a timing diagram showing changes in the rotation speed of the cargo-handling motor.

FIG. 5E is a timing diagram showing changes in the torque of the cargo-handling motor.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An industrial vehicle according to one embodiment will now be described with reference to FIGS. 1 to 5E. In this embodiment, industrial vehicle is a forklift 10.

Figure 1:
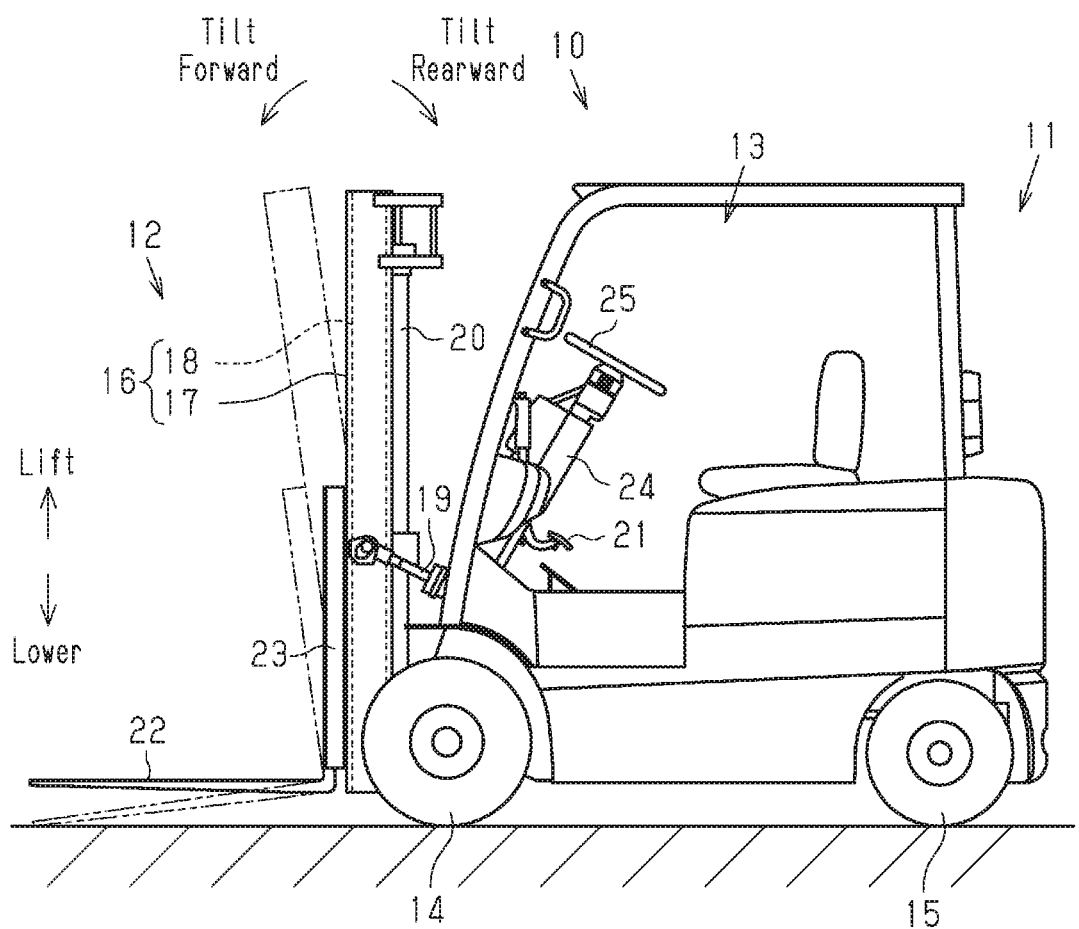
FIG. 1 is a side view showing a forklift.

As shown in FIG. 1, the forklift 10 includes a vehicle body 11 and a cargo-handling device 12 provided at the front part of the vehicle body 11. The vehicle body 11 includes an operator cab 13 at the center. Drive wheels (front wheels) 14 are provided in the front-lower part of the vehicle body 11. Steerable wheels (rear wheels) 15 are provided in the rear-lower part of the vehicle body 11. The vehicle body 11 accommodates a drive source that supplies driving force to the drive wheels 14. The drive source is coupled to the drive wheels 14.

The cargo-handling device 12 includes an upright mast assembly 16 in the front part of the vehicle body 11. The mast assembly 16 is a multistage (two-stage, in the present embodiment) mast assembly 16 that includes a pair of left and right outer masts 17 and a pair of left and right inner masts 18. A hydraulic tilt cylinder 19, which is a cargo-handling cylinder, is coupled to each outer mast 17. The outer masts 17 are tilted forward or rearward relative to the vehicle body 11 by operation of the tilt cylinders 19. A hydraulic lift cylinder 20, which is a cargo-handling cylinder, is coupled to each inner mast 18. The inner masts 18 are lifted or lowered by being slid in the outer masts 17 by operation of the lift cylinders 20. The operator cab 13 is provided with an accelerator pedal 21 in the lower part. The forklift 10 travels at a vehicle speed corresponding to the operation amount of the accelerator pedal 21. A pair of left and right forks 22 is attached to the mast assembly 16 with a lift bracket 23. The lift bracket 23 is attached to the inner masts 18 to be lifted or lowered.

Cargo-handling operations such as picking up and placing are performed by scooping up a pallet (not shown) on which a cargo is placed by using the forks 22 and placing it on a predetermined position. The forks 22 are lifted or lowered together with the lift bracket 23 by the inner masts 18 being lifted or lowered along the outer masts 17 by the lift cylinders 20. The forks 22 are also tilted (forward or rearward) together with the mast assembly 16 by operation of the tilt cylinders 19.

The operator cab 13 is provided with a steering column 24. A steering wheel 25 is attached to the steering column 24. The steering wheel 25 is operated when changing the tire angle of the steerable wheels 15 to change the traveling direction of the forklift 10. The operator cab 13 is provided with operating members for operating the cargo-handling device 12, such as a lift lever for lifting or lowering the forks 22 and a tilt lever for tilting the mast assembly 16.

Next, a fuel cell system 30 and a vehicle system 50, which are mounted on the vehicle body 11, will be described.

Figure 2:
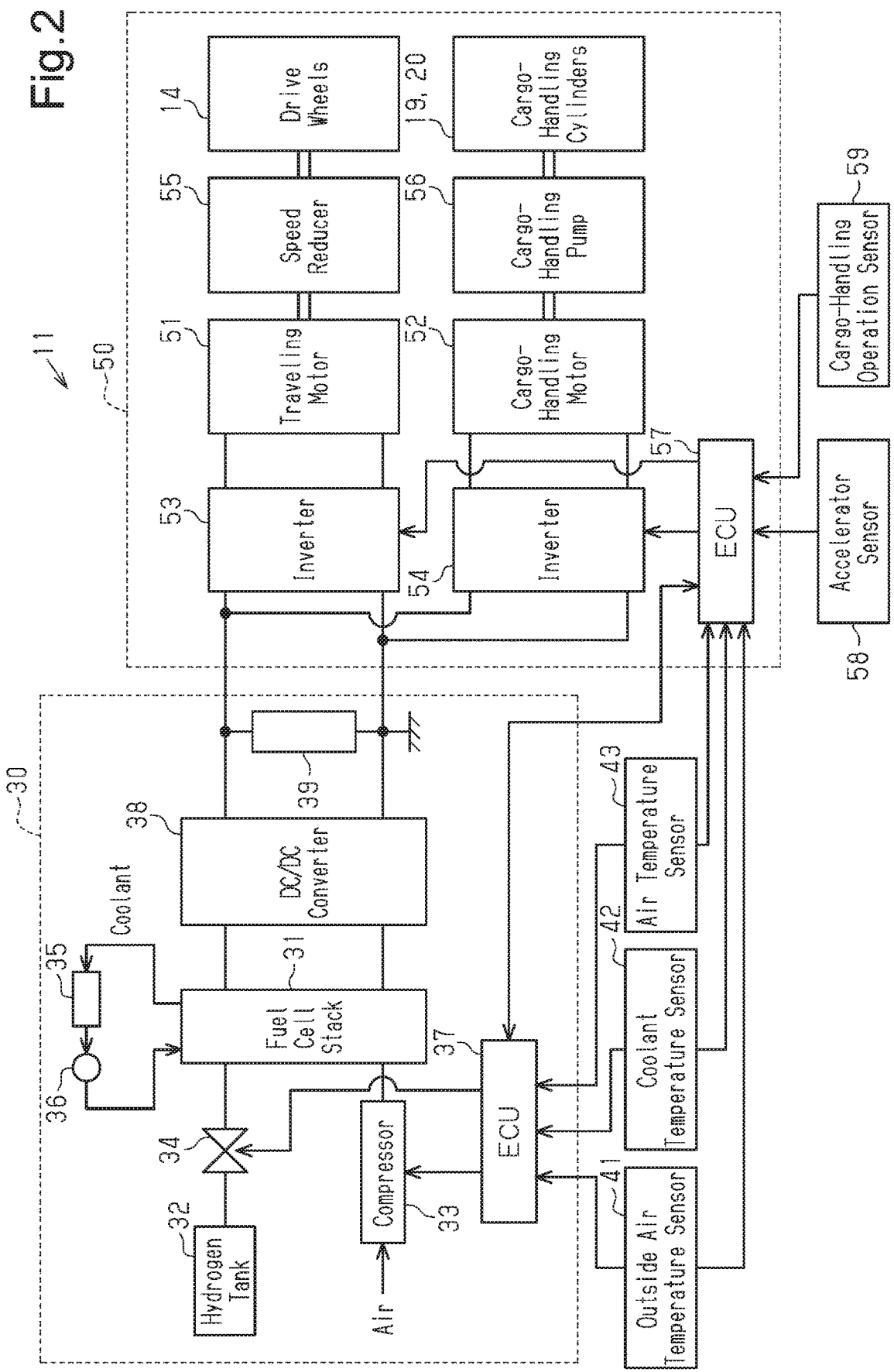
FIG. 2 is a block diagram showing a fuel cell system and a vehicle system.

As shown in FIG. 2, the vehicle body 11 is provided with the fuel cell system 30 and the vehicle system 50. The fuel cell system 30 includes a fuel cell stack 31, a hydrogen tank 32, a compressor 33, an electromagnetic valve 34, a radiator 35, a water pump 36, an electronic control unit (hereinafter referred to as a fuel cell system ECU) 37, a DC/DC converter 38, and a capacitor 39. The vehicle system 50 includes a traveling motor 51, a cargo-handling motor 52, inverters 53 and 54, a speed reducer 55, the drive wheels 14, a cargo-handling pump 56, cargo-handling cylinders including the tilt cylinders 19 and the lift cylinders 20, and an electronic control unit (hereinafter referred to as a vehicle ECU) 57.

The fuel cell stack 31 is constituted by stacking multiple cells, and the cells are electrically connected in series to each other. The hydrogen tank 32 is capable of supplying hydrogen gas to the fuel cell stack 31. The compressor 33 is capable of supplying air containing oxygen to the fuel cell stack 31. In the fuel cell system 30, hydrogen supplied from the hydrogen tank 32 and oxygen in the air supplied from the compressor 33 cause a chemical reaction in the fuel cell stack 31, which generates electric energy. The electromagnetic valve 34 is provided in a pipe connecting the fuel cell stack 31 and the hydrogen tank 32 to each other. The electromagnetic valve 34 regulates the amount of hydrogen gas supplied to the fuel cell stack 31. The fuel cell system ECU 37 controls the electromagnetic valve 34 and the compressor 33 to control the power generated in the fuel cell stack 31.

The fuel cell stack 31 includes a coolant circulation route. The coolant circulation route is provided with the radiator 35 and the water pump 36. The radiator 35 includes a radiator fan (not shown). Circulation of coolant through the circulation route cools the fuel cell stack 31. The compressor 33, the water pump 36, the radiator fan, and the like are accessories in the fuel cell system 30 and are driven by the power of the fuel cell system 30. Although not illustrated, the fuel cell stack 31 includes an air discharge route through which air discharged from the fuel cell stack 31 flows. The air discharge route is open to the atmosphere. The air discharged from the fuel cell stack 31 is discharged to the outside of the fuel cell system 30 via the air discharge route.

The fuel cell stack 31 is electrically connected to the capacitor 39 via the DC/DC converter 38. The capacitor 39 is connected to the traveling motor 51 via the inverter 53. The capacitor 39 is also connected to the cargo-handling motor 52 via the inverter 54. That is, the fuel cell stack 31 is electrically connected to the traveling motor 51 and the cargo-handling motor 52 via the DC/DC converter 38, the capacitor 39, and the inverters 53, 54. The fuel cell system 30 is electrically connected to the vehicle system 50. The DC power generated in the fuel cell stack 31 is stepped down to a predetermined voltage by the DC/DC converter 38 and then delivered to the traveling motor 51 and the cargo-handling motor 52 via the capacitor 39 and the inverters 53 and 54. When the traveling motor 51 and the cargo-handling motor 52 are driven by the power supplied from the fuel cell system 30, the cargo-handling operation and the traveling operation are executed. In addition, the vehicle system 50 has accessories (not shown) such as lighting equipment and a power steering apparatus, and these accessories are driven by the power supplied from the fuel cell system 30.

The capacitor 39 is connected in parallel with the vehicle electric loads (the traveling motor 51, the cargo-handling motor 52, and the like) and is electrically connected to the fuel cell stack 31. When the power generated in the fuel cell stack 31 exceeds the power required by the vehicle electric loads (the traveling motor 51, the cargo-handling motor 52, and the like), the excess power is used to charge the capacitor 39. In contrast, when the generated power falls below the required power, the power corresponding to the insufficiency is discharged from the capacitor 39.

The vehicle system 50 includes a vehicle ECU 57, which is configured with a microcomputer as the dominant constituent. When the operated amount of the accelerator pedal 21 is detected by an accelerator sensor 58, the vehicle ECU 57 controls the inverter 53 based on the operated amount of the accelerator pedal 21. The rotation speed of the traveling motor 51 is controlled by controlling the inverter 53, and the rotational force generated by the traveling motor 51 is transmitted to the drive wheels 14 via the speed reducer 55. In this manner, the fuel cell system 30 supplies power to the inverter 53 for traveling, which in turn supplies the power to the traveling motor 51. The rotational force generated by the traveling motor 51 is decelerated by the speed reducer 55 and rotates the drive wheels 14. This generates driving force in the vehicle body 11.

When the operated amounts of the operating members such as the lift lever and the tilt lever are detected by a cargo-handling operation sensor 59, the vehicle ECU 57 controls the inverter 54 based on the operated amounts of the operating members. The inverter 54 is controlled to control the rotation speed of the cargo-handling motor 52. The rotational force of the cargo-handling motor 52 is transmitted to the cargo-handling cylinders (the tilt cylinders 19 and the lift cylinders 20) via the cargo-handling pump 56. In this manner, the fuel cell system 30 supplies power to the inverter 54 for cargo-handling, which in turn supplies the power to the cargo-handling motor 52. The rotational force generated by the cargo-handling motor 52 rotates the cargo-handling pump 56, so that the pressure or the flow rate of the hydraulic oil is regulated to operate the tilt cylinders 19 and the lift cylinders 20.

The fuel cell system ECU 37 is connected to the vehicle ECU 57. Specifically, the fuel cell system ECU 37 and the vehicle ECU 57 can communicate with each other through a communication means such as serial communication or CAN communication. That is, the fuel cell system ECU 37 and the vehicle ECU 57 share information through communication. The fuel cell system ECU 37 and the vehicle ECU 57 may also communicate with each other via analog signals.

Next, a hydraulic system mounted on the vehicle body 11 will be described.

Figure 3:
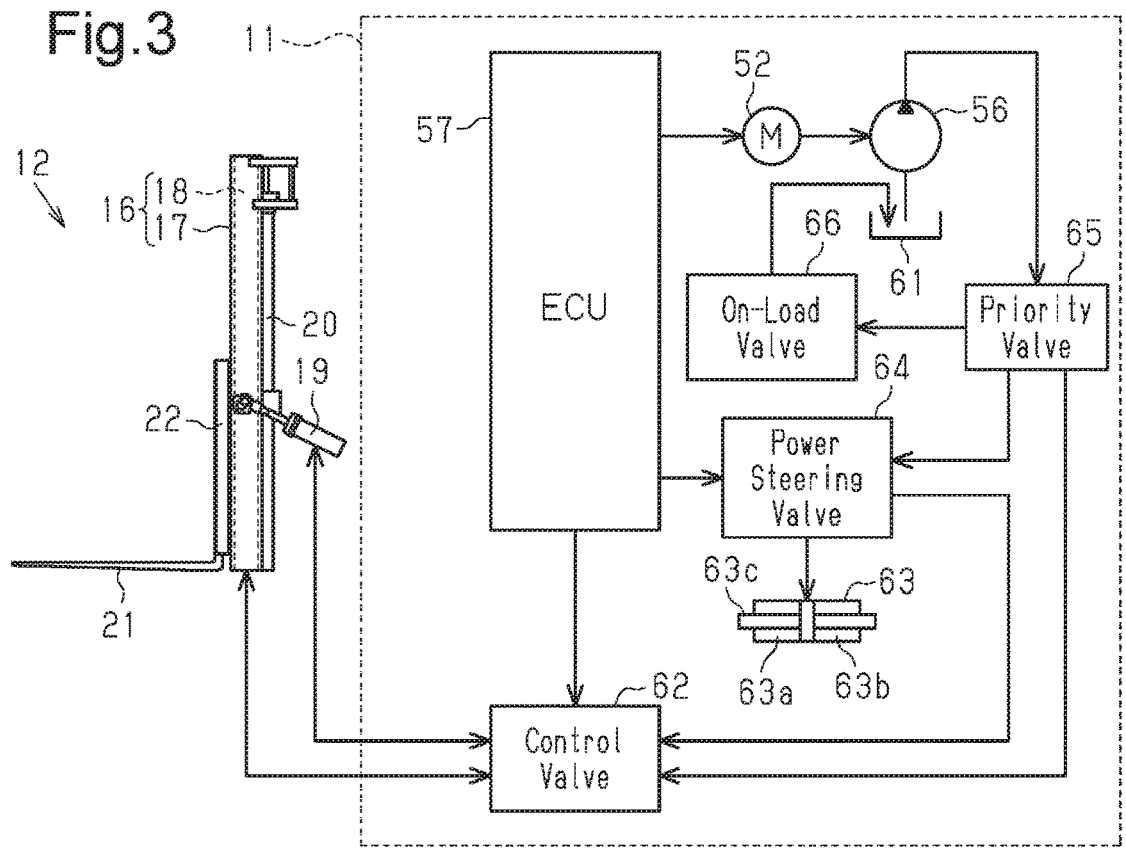
FIG. 3 is a schematic diagram showing a hydraulic system.

As shown in FIG. 3, the vehicle body 11 is provided with a hydraulic oil tank 61, in which hydraulic oil is stored. The hydraulic oil stored in the hydraulic oil tank 61 is pumped up by the cargo-handling pump 56. The vehicle body 11 is provided with a control valve 62 and a power steering valve 64. The control valve 62 is configured to switch supply of hydraulic oil to the tilt cylinders 19 and the lift cylinders 20, which constitute the cargo-handling device 12. The power steering valve 64 is configured to switch supply of hydraulic oil to a power steering cylinder 63.

The power steering cylinder 63 includes two oil chambers 63a, 63b. Hydraulic oil is supplied to and drained from the oil chambers 63a, 63b so as to operate a rod 63c coupled to the steerable wheels 15. In accordance with the operation of the rod 63c, the steerable wheels 15 are steered to be oriented either leftward or rightward. The operation direction of the rod 63c is controlled by the vehicle ECU 57 in accordance with a target tire angle.

The control valve 62 and the power steering valve 64 are connected to the cargo-handling pump 56 via a priority valve 65, which functions as a control valve. The hydraulic oil supplied to the priority valve 65 flows preferentially to the power steering valve 64. Specifically, a predetermined amount of the hydraulic oil supplied to the priority valve 65 is supplied to the power steering valve 64. Also, the control valve 62 is supplied with some of the hydraulic oil supplied to the priority valve 65. Specifically, the control valve 62 is supplied with an amount of hydraulic oil by which the amount of hydraulic oil supplied to the power steering valve 64 is exceeded.

The priority valve 65 is connected to the hydraulic oil tank 61 via an on-load valve 66 and a return filter (not shown). The on-load valve 66 is opened when the pressure of the hydraulic oil that flows into the on-load valve 66 from the priority valve 65 becomes higher than or equal to a predetermined pressure. At this time, the hydraulic oil flows to the hydraulic oil tank 61 from the priority valve 65 via the on-load valve 66. This returns the excess hydraulic oil to the hydraulic oil tank 61 from the priority valve 65. For example, in some cases, neither the steering wheel 25 nor the operating members for operating the cargo-handling device 12 such as the tilt lever and the lift lever are operated. In this situation, the hydraulic oil that is not supplied to the control valve 62 or the power steering valve 64 flows to the hydraulic oil tank 61 from the priority valve 65 via the on-load valve 66. In the present embodiment, the tilt cylinders 19, the lift cylinders 20, and the power steering cylinder 63 function as supply destinations. The control valve 62, the power steering valve 64, and the priority valve 65 function as control valves. The on-load valve 66 functions as a returning device.

To cause the fuel cell system 30 to perform a warm-up operation, the fuel cell system ECU 37 executes warm-up control of the fuel cell system 30, in which the fuel cell stack 31 is operated. The warm-up control is executed, for example, on condition that starting of the forklift 10 is a cold start. In the present embodiment, the starting is determined to be a cold start and the warm-up control is executed when at least one of the following two conditions is met. Alternatively, the starting may be determined to be a cold start and the warm-up control may be executed when both of the following two conditions are met. Also, only one of the following two conditions may be used as a condition for determining that the starting is a cold start.

The temperature of the fuel cell stack 31 during starting of the forklift 10 is lower than or equal to a predetermined temperature.

The outside air temperature during starting of the forklift 10 is lower than or equal to a predetermined temperature.

As the temperature of the fuel cell stack 31, a detection value can be used that is detected by a coolant temperature sensor 42 (FIG. 2) provided in the circulation route of coolant that cools the fuel cell stack 31. Also, a detection value can be used that is detected by an air temperature sensor 43 (FIG. 2) provided in the air discharge route, through which the air discharged from the fuel cell stack 31 flows. One of these detection values may be used as the temperature of the fuel cell stack 31. Alternatively, the temperature of the fuel cell stack 31 may be estimated based on the two detection values. As the outside air temperature, the detection value detected by an outside air temperature sensor 41 (FIG. 2) is used. As the predetermined temperature, zero degrees or a low temperature that is higher than zero degrees is used.

In the warm-up control, the fuel cell stack 31 is operated such that the power generated in the fuel cell stack 31 becomes a predetermined constant amount of power. Also, in the warm-up control, the operation of the fuel cell stack 31 is stopped when the operation of the fuel cell stack 31 has been continued for a predetermined period of time. The vehicle ECU 57 executes a motor operation control to continue the operation of the cargo-handling motor 52 during execution of the warm-up control. In the present embodiment, the fuel cell system ECU 37 and the vehicle ECU 57 function as controllers.

The motor operation control will now be described together with the operation of the present embodiment. The motor operation control is executed on condition that the forklift 10 has been started.

Figure 4:
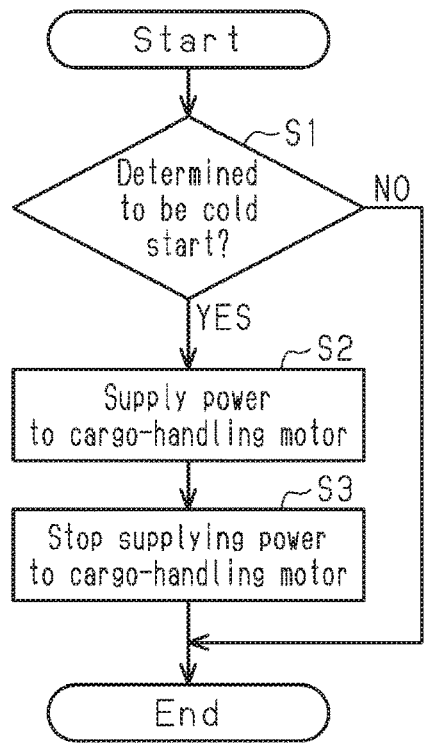
FIG. 4 is a flowchart showing a procedure of a motor operation control.

In the motor operation control, it is determined whether the starting has been determined to be a cold start (step S1) as shown in FIG. 4. When the condition of a cold start in the warm-up control is not met so that the starting is not determined to be a cold start (step S1: NO), the control is ended. When the condition of a cold start is met so that the starting is determined to be a cold start (step S1: YES), the warm-up control of the fuel cell system 30 is executed to supply power to the cargo-handling motor 52 from the fuel cell stack 31 (step S2). In step S2, the power supply to the cargo-handling motor 52 from the fuel cell stack 31 is continued for the predetermined period of time, for which operation of the fuel cell stack 31 in the warm-up control is continued.

In step S2, when power is supplied to the cargo-handling motor 52 from the fuel cell stack 31, the cargo-handling motor 52 is operated to drive the cargo-handling pump 56. The cargo-handling pump 56 then pumps up hydraulic oil from the hydraulic oil tank 61. The hydraulic oil is supplied to the priority valve 65 from the cargo-handling pump 56.

At this time, if the steering wheel 25 or the operating members for operating the cargo-handling device 12 such as the tilt lever and the lift lever is being operated, the hydraulic oil is supplied preferentially to the power steering valve 64 from the priority valve 65. Also, the control valve 62 is supplied with some of the hydraulic oil supplied to the priority valve 65. Specifically, the control valve 62 is supplied with an amount of hydraulic oil by which the amount of hydraulic oil supplied to the power steering valve 64 is exceeded. The hydraulic oil supplied to the power steering valve 64 is supplied to the power steering cylinder 63, which is a supply destination. When supplied with hydraulic oil, the power steering cylinder 63 is operated to steer the steerable wheels 15. The hydraulic oil supplied to the control valve 62 is supplied to the tilt cylinders 19 and the lift cylinders 20, which are supply destinations. When the tilt cylinders 19 are supplied with hydraulic oil and operated, the outer masts 17 are tilted forward or rearward relative to the vehicle body 11. Also, when the lift cylinders 20 are supplied with hydraulic oil and operated, the inner masts 18 are slid up or down in the outer masts 17. The operation of the cargo-handling motor 52 is continued while hydraulic oil is being supplied to the supply destinations from the priority valve 65.

In contrast, if the steering wheel 25 and the operating members for operating the cargo-handling device 12 are not being operated, the control valve 62 and the power steering valve 64 are closed. Thus, hydraulic oil stops being supplied to the supply destinations from the priority valve 65. At this time, the hydraulic oil that is not supplied to the control valve 62 or the power steering valve 64 flows to the hydraulic oil tank 61 from the priority valve 65 via the on-load valve 66. Also, hydraulic oil is supplied to the priority valve 65 from the hydraulic oil tank 61 through operation of the cargo-handling pump 56. Accordingly, the hydraulic oil continues being circulated while the cargo-handling motor 52 continues operating. At this time, since hydraulic oil is returned to the hydraulic oil tank 61 from the priority valve 65 by the on-load valve 66, hydraulic oil is not supplied to the supply destinations unnecessarily. Thus, the operation of the cargo-handling motor 52 can be continued while limiting unnecessary operation of the forklift 10 that accompanies supply of hydraulic oil to the supply destinations.

In step S2, when the power supply to the cargo-handling motor 52 from the fuel cell stack 31 is continued for a predetermined period of time, the power supply to the cargo-handling motor 52 from the fuel cell stack 31 is stopped (step S3). This stops the operation of the cargo-handling motor 52.

The timing diagrams of FIGS. 5A to 5E show examples of changes over time of, from the top, the amount of power generated in the fuel cell stack 31, the amount of power consumption of the cargo-handling motor 52, the temperature of the fuel cell system 30, the rotation speed of the cargo-handling motor 52, and the torque of the cargo-handling motor 52. The temperature of the fuel cell system 30 shown in FIG. 5C represents the temperature of the water in the fuel cell system 30.

When the warm-up control is started at a point in time t1, the fuel cell stack 31 is operated to supply power to the cargo-handling motor 52. At this time, a great part of the amount of power generated in the fuel cell stack 31 is consumed by the cargo-handling motor 52. When the fuel cell stack 31 generates power, the power for operating accessories (the compressor 33, the water pump 36, the radiator fan, and the like) in the fuel cell system 30 is required. Therefore, the power supplied to the cargo-handling motor 52 from the fuel cell stack 31 is based on the power generated in the fuel cell stack 31 (output power) and the power consumed by the accessories (loss). In the example shown by FIGS. 5A to 5E, the power supplied to the cargo-handling motor 52 from the fuel cell stack 31 is less than the power generated in the fuel cell stack 31 by the amount corresponding to the power consumed by the accessories.

Also, at the point in time t1, the rotation speed of the cargo-handling motor 52 is set such that the cargo-handling motor 52 consumes the power supplied from the fuel cell stack 31. Since the temperature is low and the temperature of the hydraulic oil is low at the point time t1, the torque generated by the cargo-handling motor 52 is high. Thus, even if the rotation speed of the cargo-handling motor 52 is lowered, the cargo-handling motor 52 consumes a great amount of power. Therefore, at the point in time t1, the rotation speed of the cargo-handling motor 52 is set to a relatively low predetermined value.

The warm-up control and the motor operation control are executed from the point in time t1 to a point in time t2. Accordingly, the power generation by the fuel cell stack 31 and the power consumption by the cargo-handling motor 52 are continued. As time advances from the point in time t1 to the point in time t2, the operation of the fuel cell stack 31 increases the temperature of the fuel cell system 30.

During the period from the point in time t1 to the point in time t2, circulation of the hydraulic oil increases the temperature of the hydraulic oil. As the temperature of the hydraulic oil increases, the torque generated by the cargo-handling motor 52 decreases. Thus, during the period from the point in time t1 to the point in time t2, the power consumption by the cargo-handling motor 52 is maintained at a constant level by gradually increasing the rotation speed of the cargo-handling motor 52. In the motor operation control executed in the period from the point in time t1 to the point in time t2, multiple values are prepared in advance for the rotation speed of the cargo-handling motor 52. In this example, the rotation speed of the cargo-handling motor 52 is changed at predetermined intervals such that the rotation speed is increased gradually.

At the point in time t2, the warm-up control is ended, and the operation of the cargo-handling motor 52 is stopped. This causes the rotation speed and the torque of the cargo-handling motor 52 to be zero. The cargo-handling motor 52 thus stops consuming power. When the warm-up control is ended, the operation of the fuel cell stack 31 is adjusted such that the power generated in the fuel cell stack 31 is discretely reduced (in three steps in the example of FIG. 5A). The adjustment is executed to reduce the fluctuation of the voltage of the fuel cell stack 31. When the operation of the fuel cell stack 31 is stopped, the fuel cell stack 31 stops generating power.

The above-described embodiment achieves the following advantages.

(1) The operation of the cargo-handling motor 52 is continued during the warm-up control. Accordingly, when a high power is generated in the fuel cell stack 31 during the warm-up control, the generated power is consumed by the cargo-handling motor 52. This allows the fuel cell stack 31 to generate a high power so that the warm-up control of the fuel cell system 30 can be executed. The warm-up of the fuel cell system 30 is thus completed at an early stage.

(2) The rotation speed of the cargo-handling motor 52 is gradually increased as the temperature of the hydraulic oil increases. Accordingly, during the execution of the warm-up control, the power consumption by the cargo-handling motor 52 is maintained at a value that allows the cargo-handling motor 52 to consume the amount of power generated in the fuel cell stack 31.

(3) For example, even if the power generated in the fuel cell stack 31 during the warm-up control is supplied to the traveling motor 51, a high power can be generated in the fuel cell stack 31 to execute the warm-up control of the fuel cell system 30. This allows the warm-up of the fuel cell system 30 to be completed at an early stage. However, if power is supplied to the traveling motor 51, the drive wheels 14 are driven, which can cause the forklift 10 to act unexpectedly. For example, the discharge pressure of the compressor 33 may be increased during the warm-up control, so that a great part of the power generated in the fuel cell stack 31 is supplied to the compressor 33. This configuration would allow a high power to be generated in the fuel cell stack 31 to execute the warm-up control of the fuel cell system 30, so that the warm-up of the fuel cell system 30 is completed at an early stage. However, if the discharge pressure of the compressor 33 is increased, the amount of air supplied to the fuel cell stack 31 is increased. The fuel cell stack 31 thus tends to be dry, which possibly increases the overvoltage (IR drop). In this respect, the present embodiment causes the cargo-handling motor 52 to consume the power generated in the fuel cell stack 31. This allows the warm-up of the fuel cell system 30 to be completed at an early stage, while limiting the influence on the operation of the forklift 10 and the performance of the fuel cell stack 31.

(4) At normal times, hydraulic oil does not have a low temperature and has a low viscosity. Thus, the hydraulic oil flows smoothly through the hydraulic system, and a great amount of power is not needed to drive the cargo-handling motor 52. However, under low temperature, the hydraulic oil has a low temperature and has a high viscosity. Thus, the hydraulic oil does not flow smoothly through the hydraulic system, and a great amount of power is needed to drive the cargo-handling motor 52. In this respect, according to the present embodiment, the fuel cell stack 31 supplies power to the cargo-handling motor 52, which consumes a great amount of power under low temperature, during the execution of the warm-up control. This efficiently consumes the power generated in the operation of the fuel cell stack 31.

(5) The voltage that can be extracted from the fuel cell stack 31 varies depending on the standards of the forklift 10. To supply a desired amount of power to the traveling motor 51 and the cargo-handling motor 52 from the fuel cell stack 31 regardless of the standards of the forklift 10, it is preferable to use the capacitor 39, which has no limit on the amount of generated current, as a rechargeable battery electrically connected to and mounted on the fuel cell stack 31. However, since the capacitor 39 has a small capacitance, the capacitor 39 cannot consume the power generated in the fuel cell stack 31 during the warm-up control. In this respect, according to the present embodiment, even when the capacitor 39 is mounted on the fuel cell system 30, the power generated in the operation of the fuel cell stack 31 is efficiently consumed.

The above-described embodiment may be modified as follows. The above-described embodiment and the following modifications can be combined as long as the combined modifications remain technically consistent with each other.

Under low temperature, the voltage of the fuel cell stack 31 can be lower than that at normal times due to increase in the membrane resistance in the cells and local freezing of produced water. When the fuel cell stack 31 and the capacitor 39 are connected to each other via the DC/DC converter 38 as in the above-described embodiment, the voltage of the fuel cell stack 31 can be lowered to a voltage lower than or equal to that of the capacitor 39, which may hinder normal operation of the DC/DC converter 38. In this respect, the warm-up control may be executed while operating the fuel cell stack 31 at a constant voltage no lower than the voltage of the capacitor 39. This prevents the above-described abnormal operations of the DC/DC converter 38. When the fuel cell stack 31 is operated at a constant voltage, the amount of power supplied to the cargo-handling motor 52 from the fuel cell stack 31 varies depending on the magnitude of the current. Accordingly, during the execution of the warm-up control, the cargo-handling motor 52 may be operated at a rotation speed that allows the cargo-handling motor 52 to consume the amount of power supplied by the fuel cell stack 31. This allows the cargo-handling motor 52 to consume power in accordance with the amount of power supplied to the cargo-handling motor 52 from the fuel cell stack 31.

The water temperature in the fuel cell system 30 may be detected, and the warm-up control may be ended on condition that the water temperature has become higher than or equal to a predetermined temperature.

At the end of the warm-up control, the amount of power of the fuel cell stack 31 may be changed to zero without taking steps.

The cargo-handling motor 52 may supply hydraulic oil to one of the power steering cylinder 63 and the group of the cargo-handling cylinders.

The forklift 10 may be a vehicle that is controlled totally manually, a vehicle that is controlled totally automatically, or a vehicle that is controlled partly manually and partly automatically.

The warm-up control and the motor operation control in the above-described embodiment may be employed in an industrial vehicle other than a forklift such as a toeing tractor.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An industrial vehicle comprising a fuel cell system, wherein
    the fuel cell system is electrically connected to a vehicle system,
    the fuel cell system includes
        a fuel cell stack, and
        a capacitor that is electrically connected to the fuel cell stack,
    the vehicle system includes
        a plurality of valves including a control valve, a power steering valve, and a priority valve that switch a supply of hydraulic oil to supply destinations including at least one of a power steering cylinder or a cargo-handling cylinder,
        a cargo-handling pump that supplies hydraulic oil stored in a hydraulic oil tank to the control valve,
        a cargo-handling motor that drives the cargo-handling pump,
        a returning device configured to return the hydraulic oil from the control valve to the hydraulic oil tank when supply of the hydraulic oil from the control valve to the supply destinations is stopped, and a controller configured to control operation of the cargo-handling motor, the controller is configured to execute a warm-up control to warm up the fuel cell system by operating the fuel cell stack, and continue supplying power from the fuel cell stack to the cargo-handling motor during execution of the warm-up control.

2. An industrial vehicle comprising a fuel cell system, wherein the fuel cell system is electrically connected to a vehicle system, the fuel cell system includes a fuel cell stack, and a capacitor that is electrically connected to the fuel cell stack, the vehicle system includes a control valve that switches supply of hydraulic oil to supply destinations including at least one of a power steering cylinder or a cargo-handling cylinder, a cargo-handling pump that supplies hydraulic oil stored in a hydraulic oil tank to the control valve, a cargo-handling motor that drives the cargo-handling pump, a returning device configured to return the hydraulic oil from the control valve to the hydraulic oil tank when supply of the hydraulic oil from the control valve to the supply destinations is stopped, and a controller configured to control operation of the cargo-handling motor, the controller is configured to execute a warm-up control to warm up the fuel cell system by operating the fuel cell stack, continue supplying power from the fuel cell stack to the cargo-handling motor during execution of the warm-up control, execute the warm-up control by operating the fuel cell stack such that a power generated by the fuel cell stack becomes a constant value, and operate the cargo-handling motor such that a rotation speed of the cargo-handling motor gradually increases during the execution of the warm-up control.

3. An industrial vehicle comprising a fuel cell system, wherein the fuel cell system is electrically connected to a vehicle system, the fuel cell system includes a fuel cell stack, and a capacitor that is electrically connected to the fuel cell stack, the vehicle system includes a control valve that switches supply of hydraulic oil to supply destinations including at least one of a power steering cylinder or a cargo-handling cylinder, a cargo-handling pump that supplies hydraulic oil stored in a hydraulic oil tank to the control valve, a cargo-handling motor that drives the cargo-handling pump, a returning device configure to return the hydraulic oil from the control valve to the hydraulic oil tank when supply of the hydraulic oil from the control valve to the supply destinations is stopped, and a controller configured to control operation of the cargo-handling motor, the controller is configured to execute a warm-up control to warm up the fuel cell system by operating the fuel cell stack, continue supplying power from the fuel cell stack to the cargo-handling motor during execution of the warm-up control, execute the warm-up control by operating the fuel cell stack at a constant voltage no lower than a voltage of the capacitor, and during the execution of the warm-up control, operate the cargo-handling motor at a rotation speed that allows the cargo-handling motor to consume an amount of power supplied by the fuel cell stack, and the fuel cell stack and the capacitor are connected to each other via a DC/DC converter.

* * * * *